Aug. 25, 1936.  W. C. TYLER  2,052,371
CATTLE LEADER
Filed Feb. 8, 1935
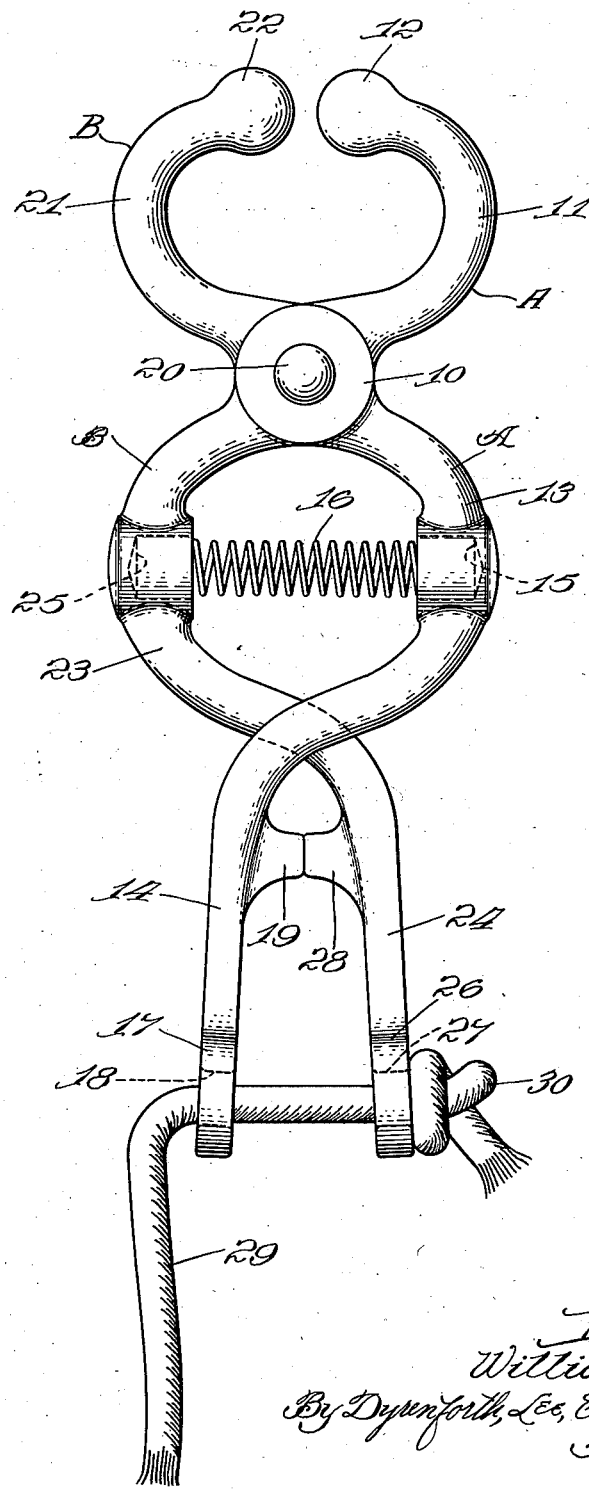
Inventor:
William C. Tyler.
By Dyrenforth, Lee, Chritton & Wiles,
Attys.

Patented Aug. 25, 1936

2,052,371

UNITED STATES PATENT OFFICE 2,052,371

CATTLE LEADER

William C. Tyler, Joliet, Ill., assignor to William E. Pratt Mfg. Co., Joliet, Ill., a corporation of Illinois Application February 8, 1935, Serial No. 5,654

5 Claims. (Cl. 119—154)

This invention relates to a cattle leader and has for its primary object the provision of a cattle leader which is simple, automatic and positive in operation, and which may be employed without injury to the nose of the animal.

The invention is illustrated in a preferred embodiment, by the accompanying drawing, in which the figure is a plan view of a leader embodying my invention, a leader rope being shown attached to the device.

In the illustration given, the leader comprises a pair of pivotally connected members A and B. The member A is provided with a circular bearing portion 10 and with a curved arm 11 integrally formed with the bearing 10. The end of arm 11 is enlarged to form a ball 12. The rear or handle portion of the member A comprises a semi-circular portion 13 and a substantially straight handle portion 14. The semi-circular portion 13 is provided on its inner side with a recess 15 adapted to receive one end of compression spring 16. The straight handle portion 14 is provided with an enlarged circular end 17 provided with a chamfered opening 18. On its inner side, the member 14 is provided with a stop lug 19.

The member B is substantially a duplicate of the member A. It is provided with a circular flange 10 aligned with flange 10 of member A and secured thereto by rivet 20. The member B is also provided with a forwardly extending curved arm 21 terminating in a ball 22 opposed to ball 12 of the arm 11. The handle portion of member B is provided with a semi-circular portion 23 and a substantially straight handle portion 24. The semi-circular portion 23 is provided with a recess 25 adapted to receive the other end of compression spring 16. The handle member 24 is provided with an enlarged end 26 provided with a chamfered hole 27. On the inner side of the handle portion 24 is a stop lug 28 adapted to engage the lug 19 of member A. A leader rope 29 extends through the openings 18 and 29 and is provided with a knot 30 which prevents the end from being drawn through opening 27.

In the operation of the device, the balls 12 and 22 may be spread apart by grasping the semi-circular portions 13 and 23 of members A and B and pressing them together against the force of spring 16, this being accomplished readily by one hand; or, if desired, the handle portions 14 and 24 of the members may be drawn apart to separate the ball points 12 and 22. When the balls 12 and 22 are spread apart, they may be thrust into the nostrils of the animal and then released, the pressure of spring 16 bringing the ball ends against the partition of the nose. At the same time, the stops 19 and 22 engage and limit the inward movement of balls 12 and 22. In the use of the leader rope in the manner described with the rope threaded through the openings 18 and 27 and knot 30 engaging opening 27, any tension on rope 29 serves to hold the handle portions 14 and 24 together and thus maintains the balls 12 and 22 in engaging position. At the same time, engagement of stops 19 and 28 prevent injury to the nose partition. It will be observed that the spring 16, having its ends housed within the sockets 15 and 25 cannot injure the animal or the person applying the device.

In order to disengage the leader, it is only necessary to grasp the semi-circular portions 13 and 23 and press them toward each other against the force of spring 16. This spreads the balls 12 and 22 apart so that the leader may be removed. As an alternative method for removal, the ends of the handle may be spread apart.

The use of duplicate members A and B to form the leader greatly reduces the cost of manufacture, reduces the number of spare parts that must be carried by a dealer, and permits the ready and inexpensive repair of the device should one of the members A or B be broken. The broken member can readily be replaced by one of the parts carried by the dealer and the parts riveted together.

It will be observed that the cattle leader of the foregoing construction cannot be shaken loose by cattle, the spring serving automatically to maintain the ball ends constantly in engagement with the nose; and this occurs no matter what position the leader rope be in, whether the same be taut or slack. Injury to the cattle through the pulling of the leader rope is, however, obviated by the use of the stops 19 and 28.

In the new leader construction, it will be observed that the compression spring is not only completely housed within and protected by the semi-circular portions 13 and 23, but also is protected from contact with the leader rope by the crossed handle portions 14 and 24. The crossing of the handle portions furthermore permits the employment of simple stop lugs as indicated by the numerals 19 and 28.

While in the foregoing description, I have, for the purpose of illustration, shown a specific form of leader, it will be understood that changes may be made in the details thereof without departing from the spirit of my invention. The foregoing detailed description has been given for clearness of understanding only, and no unnecessary limitations should be understood therefrom, but the appended claims should be construed as broadly as permissible, in view of the prior art.

I claim:

1. A cattle leader comprising: a pair of members pivotally connected together at an intermediate point to provide handle portions and nose-engaging arm portions, a compression spring urging said handle portions apart and urging said nose-engaging portions toward each other, and stops carried by said handle portions and limiting the inward movement of said nose-engaging arms and the expansion of said compression spring, said handle portions being provided with openings through which the leader rope may be extended.

2. A cattle leader comprising: a pair of members pivotally connected together at an intermediate point to provide handle portions and nose-engaging portions, a spring carried by said handle portions and urging said nose-engaging portions toward each other, and stop means carried by said handle portions for limiting the inward movement of said nose-engaging portions, said handle portions being provided with openings through which the leader rope may be extended.

3. A cattle leader comprising: a pair of members pivotally connected at an intermediate point to provide handle portions and nose-engaging portions, said nose-engaging portions being equipped with ball-like ends, and a compression spring extending between said handle portions and urging said handle portions apart, said handle portions being crossed at an intermediate point and provided with stops for spacing their rear portions apart and limiting the inward movement of said nose-engaging portions, the ends of said rear portions being provided with openings through which a leader rope may be extended.

4. A cattle leader comprising: a pair of members pivotally connected together at an intermediate point to provide nose-engaging arms and handles; said handles including intermediate handle portions adjacent to the pivoting point provided with sockets for retaining the ends of a compression spring, and end handle portions having stops for spacing said end handle portions apart and for limiting the inward movement of said nose-engaging arms and having aligned openings near their extremities through which a leader rope may be extended; and a compression spring having its ends secured in said sockets and adapted to urge said intermediate handle portions apart and urge said nose-engaging arms inwardly, said nose-engaging arms being urged together by said compression spring and by tension in said leader rope.

5. A cattle leader comprising: a pair of members pivotally connected together at an intermediate point to provide nose-engaging arms and handles; said members being uncrossed at the point of pivot but crossed near the middle of the handles; said handles including forward portions adjacent the pivoting point equipped to receive the ends of a spring, and end portions provided at their extremities with openings through which a leader rope may be extended and provided also with stops for limiting the inward movement of said nose-engaging arms and for maintaining separation of said end portions to form a hand grip; and a compression spring mounted between the forward portions of said handles and adapted to urge said forward portions apart.

WILLIAM C. TYLER.